3,186,394
AIR SUPPLY FOR INTERNAL COMBUSTION ENGINES
Michael Ramun, Youngstown, Ohio
(50 Orlando Drive, Canfield, Ohio)
Filed Nov. 13, 1963, Ser. No. 323,357
7 Claims. (Cl. 123—122)

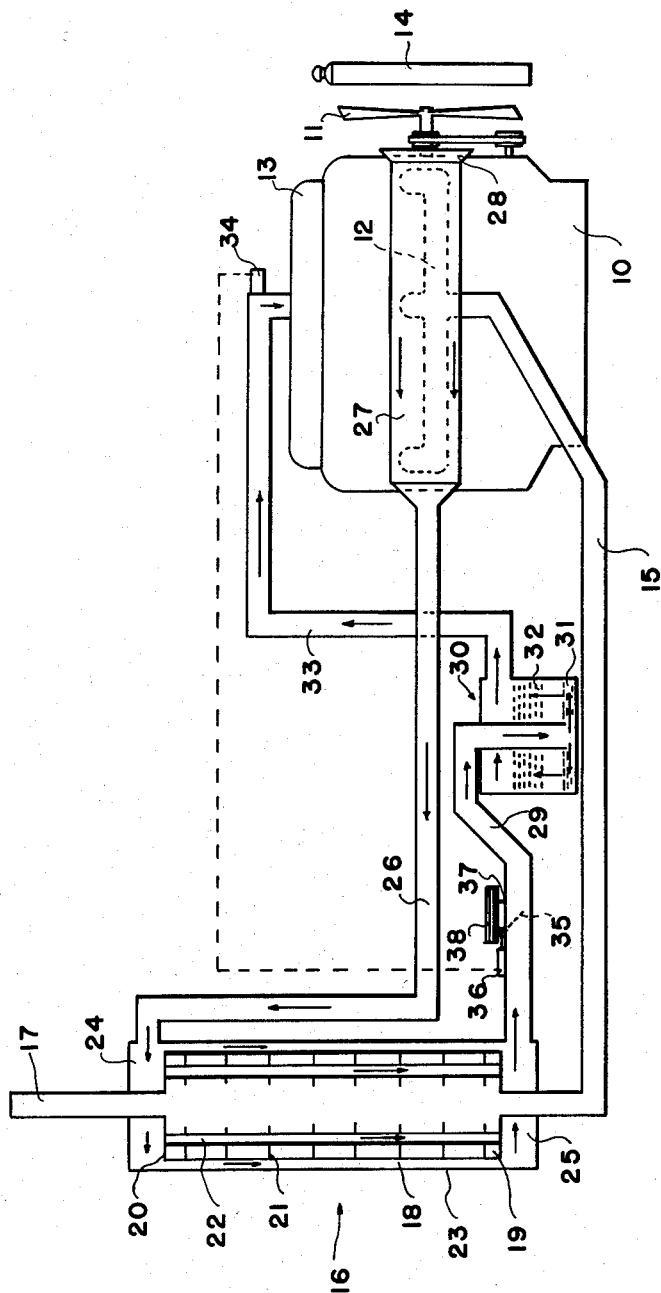

This invention relates to the operation of internal combustion engines, primarily for road vehicles, and while the invention has special application to engines of the diesel type most of its advantages are also available for gasoline engines. Modern engines, whether of the diesel or gas type, are commonly designed with large displacements so that enormous volumes of air for combustion are continuously required during normal operation of the engine and/or vehicle. Further, to provide for the efficient inflow of this large quantity of air so that complete combustion is insured and so that there is no tendency to starve the engine, the engines and intake manifolds therefor are designed with large direct air inlet passages and valves, resulting in what is commonly termed a "free-breathing" design. Also, the horsepower-to-weight ratio in modern engines is vastly increased, and all of these factors tend to decrease the rise in temperature of the combustion air before the air passes the valve structures and enters into the cylinders. As a consequence, sections of the engines never reach optimum operating temperatures, the engines are noisy when operating in cold night air, for example, and under similar adverse conditions the rate of fuel consumption is higher and in the case of diesels, particularly, vibration and increasing detonations occur.

Because of the physical size of the larger engines currently used for highway trucks and tractors, the configuration of the vehicles, and the large volumes of combustion air now required, it is common practice to locate the air cleaner at a position remote from the engine and thus deprived from the radiant heat thereof, and under certain conditions of atmospheric temperature and humidity freezing and other serious difficulty may arise in the operation of this device. These devices are usually of the oil bath type wherein lower temperature decreases the viscosity of the oil which coupled with the deposition of water droplets and/or ice greatly decreases the efficiency of the device and chokes down the volume of free flowing air available for combustion.

It is the primary object of the present invention to provide an air-supply system for the internal combustion engine, primarily for road vehicle uses, which overcomes the above outlined operation difficulties in a safe, simple and efficient manner. Most important in the solution of the problems is the preheating of the combustion air, and while this has heretofore been proposed by the use of heat exchangers acted on by the products of combustion of the engine, none have been practical or adopted for the reason that the increased flow resistance in the combustion air-supply system utilizing such heat exchangers creates excess vacuum in the air inlet manifold or manifolds of the engine which tends to starve the engine and nullify the advantages of the above mentioned "free-breathing" design. The problem is overcome by the present invention by feeding incoming air to the heat exchanger under pressure as may be developed by the cooling fan of the engine or by other fan or blower means as desired. In accordance with the preferred embodiment of the invention, the air is pressurized in a shroud having an enlarged funnel-shaped inlet end positioned closely adjacent the back side of the engine cooling fan. Quite substantial pressures may be developed by the multi-bladed and rapidly revolving fan, and since it is common practice to mount these fans immediately behind the radiator of the engine cooling system it will be understood that the static pressure due to forward travel of the vehicle as well as heat of the radiator is available to fill the shroud with air which is initially heated and also to assist the fan in pressurizing this air. Further, I prefer to install this shroud about the exhaust manifold of the engine so that the very high temperatures attained by the manifold will act to radiate substantial quantities of heat into the air passing through the shroud.

A further and more specific object of the invention is accordingly the provision in a road vehicle powered by an internal combustion engine of a simple, practical, and inexpensive arrangement for furnishing pressurized warm air for combustion in the engine. An ancillary object of the invention is the provision of an improved combustion air supply for internal combustion engines wherein the air is fed to the engine in a more cleaner and uniform state. This latter is accomplished by preheating the air before the same is passed through the air cleaner and by maintaining a positive pressure on the air as it passes through the cleaner and before it enters the engine whereby the rate of flow of the air will be uniform, determined by the rate of displacement of the combustion chambers of the engine.

Another object of the invention is the provision in air-supply apparatus of the kind outlined above of an arrangement whereby the incoming combustion air passed through the air cleaner and furnished to the intake manifold or manifolds of the engine is maintained at a constant temperature so as to insure proper and uniform operation of the cleaner and also to preclude pre-ignition in the engine.

These and other objects and advantages of the invention will become apparent upon consideration of the following specification and the accompanying drawing wherein there is disclosed a preferred embodiment of the invention.

The sole figure of the drawing is a schematic representation of an engine installation for a motor vehicle with more or less conventional engine cooling means and exhaust and air-supply systems utilizing the principles of the present invention.

The assemblage of equipment shown in the drawing will, of course, be installed in a road vehicle such as a truck or tractor having relative ground motion as indicated by the arrow in the drawing. Reference numeral 10 represents in general the engine of the vehicle and reference numeral 11 designates the cooling fan of the engine which, in accordance with usual practice, is driven at high speed directly by the engine. Reference numeral 12 designates the exhaust manifold of the engine which is most commonly mounted on one side of the engine block, and reference numeral 13 shows schematically the air intake manifold of the engine which in some makes is mounted on one side of the engine block but in some instances is incorporated into the head structure of the engine as shown in the drawing. Reference numeral 14 designates the radiator for extracting the heat picked up by the liquid coolant for the engine, and, in accordance with usual practice this radiator is positioned immediately forward of the cooling fan 11 so that large volumes of air will be drawn thereby through the radiator.

The exhaust gases emitted from the manifold 12 are collected and discharged rearwardly through an exhaust pipe 15 leading to a muffler 16 which in larger rigs may be vertically disposed immediately behind and to one side of the driver's cab of the vehicle. Usually the muffler is comprised of an elongated sheet metal shell having sound-deadening baffles therein. The exhaust gases from the engine are discharged into one end of the shell and a tail or discharge pipe, herein shown at 17, is connected to the other end thereof whereby the spent gases may be vented to the atmosphere. According to the present invention, however, the muffler is specially constructed to lend itself for incorporation in a heat exchanging assembly whereby the incoming combustion air for the engine may be adequately preheated. Thus, the muffler illustrated comprises an outer tubular casing 18 having end headers 19 and 20 into which the exhaust pipe 15 and the tail pipe 17 are connected. Extending inwardly from the tubular casing 18 and rigidly connected thereto are a plurality of axially spaced annular sound-deadening baffles 21. The headers 19, 20 and the baffles 21 are apertured in axial alignment to receive a plurality of axially extending but circumferentially spaced air-conducting tubes 22. These latter are spaced inwardly from the inner surface of the tube 18 as shown and are open at their ends to outside of the headers 19 and 20.

Surrounding the tube 18 in radially outward spaced relation is an outer tubular shell 23 which extends axially outward of or beyond the headers 19 and 20 to provide an entry plenum chamber 24 and an outlet plenum chamber 25, the former surrounding a portion of the vent pipe 17 while the latter surrounds a portion of the exhaust pipe 15.

Air is supplied to the entry plenum chamber 24 by a conduit 26 which takes off from the rear end of a shroud 27 extending longitudinally along the side of the engine 10 in encasing relation to the exhaust manifold 12. The inner cross section of the shroud 27 is considerably larger than the vertical transverse profile of the exhaust manifold so that adequate quantities of air may pass longitudinally over the manifold through the shroud and into the conduit 26. The forward end of the shroud 27 is open and fitted with a diverging entry funnel or scoop 28 which is positioned immediately behind the fan 11 to receive therefrom large volumes of air under appreciable pressure. Since this air has already passed through the radiator 14 it will be quite warm and consequently the air received at the inlet plenum chamber 24 will already have a certain degree of preheat. This lessens the demand on the muffler preheater enabling the same to be very simply constructed, as shown.

From the outlet plenum chamber 25 of the muffler heat exchanger the air passes through conduit 29 into an air cleaner 30 which may be of any accepted type but which preferably is of the combined oil bath and filter type in which a downwardly directed tube spills the incoming air onto the surface of the oil bath to entrap and retain pieces of grit which are flung out of the air by centrifugal force. In the drawing, the oil bath is shown schematically at 31, and reference numeral 32 designates a plurality of disc type of combined filters and baffles which, of course, are mounted in the outgoing air stream above the oil bath. It is an important principle of the present invention that during normal operation of the vehicle and engine under oil atmospheric conditions that the temperature of the air cleaner as well as of the oil therein and of the incoming air remains substantially constant for most efficient and uniform operation. Specifically, the viscosity of the bath oil and the surface condition of the oil will remain such that there will be a maximum tendency for grit and other particles to separate out of the incoming air and be entrapped and retained by the oil film. It should be understood that by the time the incoming combustion air reaches the air cleaner the applied heat dissipates all ice, snow and water particles which may have a tendency to carry along bits of dust and grit.

A further conduit 33 conducts the combustion air from the outlet of the cleaner 30 to the inlet of the engine intake manifold or manifolds 13. At the point of entry of the air into this manifold or manifolds, I provide a temperature sensing device 34 which may conveniently be of the air-valve type for controlling the operation of an air-proportioning valve 35 which is mounted in the conduit 24 intermediate the plenum chamber 25 and the air cleaner 30. This valve 35 which may be operated by a small air motor 36 operates to proportion the amount of heated air which is taken from the plenum chamber 25 to the amount of fresh outside air which is taken into the conduit 29 through an opening 37 therein. This fresh outside air is roughly filtered by the discs 38. The operation of the valve 35 is such that the air which arrives at the thermostat 34 is of substantially uniform temperature since when and if the air entering the manifold 13 becomes too hot for proper ignition in the engine the controls operate automatically to admit more fresh cool outside air to thereby reduce the temperature to the desired value. Since this thermostat 34 will always be set for a considerably higher temperature than atmospheric, the air entering the cleaner 30 will always be free of ice, snow and water particles as explained above.

It should now be apparent that I have provided an improved system for supplying combustion air to an internal combustion engine which accomplishes the objects initially set out. The preheating of the air will in itself cause the engine to operate at better efficiency and the uniformity of the incoming air temperature makes for uniform expansion of valve stems, guides, etc., resulting in smoother and quieter operation of the engine. In the case of diesel engines, particularly, ignition is obtained at more optimum and uniform points in the engine cycles for best efficiency and smooth, quiet operation. A supercharging effect is obtained due to the excess volume of air supply and the fact that the air is supplied under some pressure, and this further contributes to greater power output as is well understood in the art. Engine life is prolonged and less maintenance is required on the air cleaner due to the fact that the air is drier when it enters the cleaner and thus more prone to give up its dust and dirt and also to the fact that the air cleaner operates more efficiently under uniform, consistent, and optimum conditions.

Another singular advantage of the invention is that under conditions of acceleration of a motor truck or tractor, for example, a greater supply of warm air under increased pressure is made available due to the greater speed of the engine upon dropping down of the gear ratio as is common practice in the operation of heavy rigs. Thus, the engine is caused to deliver greater power at precisely the instant greater power is required to accelerate the vehicle or to maintain its speed on an upgrade.

It should also be appreciated that the invention provides for the greater overall efficiency in the operation of the power plant than is presently obtained through the intake of raw cold air and the dissipation to the atmosphere of all the heat contained in the exhaust gases. As pointed out above, since the combustion air enters the engine at an elevated temperature the amount of fuel required to elevate the burning gases in the cylinder chambers to adequate pressure-producing levels is somewhat less, and in actual tests in 40–50 degree weather fuel economy is increased substantially—well above five percent in most instances. During these tests the temperature of the incoming air was raised approximately 100° F.

An important aspect of the invention is thought to reside in the disclosed combination of parts whereby all of these outlined advantages are obtained by the use of quite simple and very inexpensive additions to power plants of the internal combustion type, particularly for use in road vehicles operating under widely varying atmospheric conditions.

Having thus described my invention what I claim is:

1. In an installation for an internal combustion engine having an exhaust manifold, an air-intake manifold, and a cooling fan, the combination of a muffler for receiving and passing the products of combustion from said exhaust manifold, a first air-conducting shroud about said muffler for receiving and passing air in heat exchanging relation to the muffler, a cooling radiator for said engine on the opposite side of said fan from the engine, an elongated second shroud encasing said exhaust manifold and operative to receive and pass air from said radiator and fan over said exhaust manifold, said second shroud extending substantially coincident with the flow of air through said radiator and fan, a conduit connecting the outlet of said second shroud with the inlet of the first-mentioned shroud, a second conduit means interconnecting the outlet of the first-mentioned shroud with said air-intake manifold, and an air cleaner of the combined centrifugal and oil bath type interposed in said second conduit means to clean the air passing therethrough prior to entry into said air-intake manifold.

2. Apparatus according to claim 1 further characterized in that the inlet end of said second shroud which is adjacent said fan is provided with an outwardly diverging entry funnel to channel increased volumes of air displaced by said fan into said second shroud.

3. Apparatus according to claim 1 further including a temperature-sensitive device responsive to the temperature of the incoming air flowiing in said second conduit means adjacent said intake manifold, a power-operated valve and an opening in said second conduit means intermediate the outlet of the first-mentioned shroud and said air cleaner to proportion the volume of heated air from said first shroud to the volume of fresh outside air from said opening in the mixture of air supplied to said air cleaner, and means to control said power-operated valve from said temperature-sensitive means.

4. In a road vehicle having an internal combustion engine equipped with an exhaust manifold, an air-intake manifold, a cooling fan, and a cooling radiator positioned forwardly of the fan, a shroud encasing said exhaust manifold to receive and pass incoming air and to warm the same, said shroud having an entry end disposed adjacent said fan on the side thereof opposite said radiator equipped with a divergent inlet funnel to channel increased volumes of air into said shroud, conduit means interconnecting the opposite and outlet end of said shroud with said air-intake manifold, means in said conduit means to take in fresh cold outside air, thermostatically controlled means to regulate said means to take in outside air whereby the air entering said intake manifold will be at a substantially constant temperature, and means in said conduit means intermediate said means to take in outside air and said intake manifold to clean the air entering said intake manifold.

5. In apparatus for supplying combustion air to an internal combustion engine the combination of means deriving heat from the engine to warm the incoming air for combustion, means driven by said engine to raise the pressure of the incoming air for combustion prior to introduction of said air into the said engine, duct means for conveying said combustion air to said engine, and an air cleaner of the combined centrifugal and oil bath type in said duct means on the downstream side of said air heating means.

6. In a road vehicle having an internal combustion engine equipped with an exhaust manifold, an air-intake manifold, a cooling fan, and a cooling radiator positioned forwardly of the fan, a shroud encasing said exhaust manifold to receive and pass incoming air and to warm the same, said shroud having an entry end disposed adjacent said fan on the side thereof opposite said radiator equipped with a divergent inlet funnel to channel increased volumes of air into said shroud, conduit means interconnecting the opposite and outlet end of said shroud with said air-intake manifold, means in said conduit means to take in fresh cold outside air, and thermostatically controlled means to regulate said means to take in outside air whereby the air entering said intake manifold will be at a substantially constant temperature.

7. In a road vehicle having an internal combustion engine equipped with an air-intake manifold, conduit means to supply air for combustion to said manifold, heat exchange means deriving heat from combustion within the engine to heat the combustion air entering said conduit means, a valve for introducing outside cold air into said conduit means, means to control said valve in accordance with the temperature of the air in said conduit means adjacent said manifold, and an air cleaner of the combined centrifugal and oil bath type in said conduit means intermediate said valve and said manifold.

References Cited by the Examiner
UNITED STATES PATENTS

| 1,697,843 | 1/29 | Allen | 123—122 |
| 1,823,811 | 9/31 | Watkins | 123—122 |
| 2,058,204 | 10/36 | Ball | 123—122 |

RICHARD B. WILKINSON, *Primary Examiner.*

KARL J. ALBRECHT, *Examiner.*